Nov. 18, 1947.    J. M. FOWLE ET AL    2,430,924
METHOD AND MEANS FOR PRODUCING CONTOURS IN MATERIAL
Filed Sept. 21, 1940    3 Sheets-Sheet 2
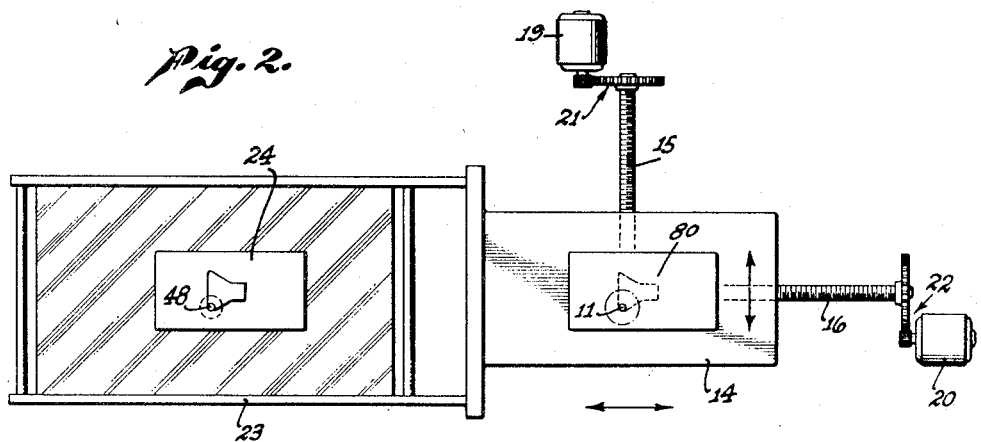
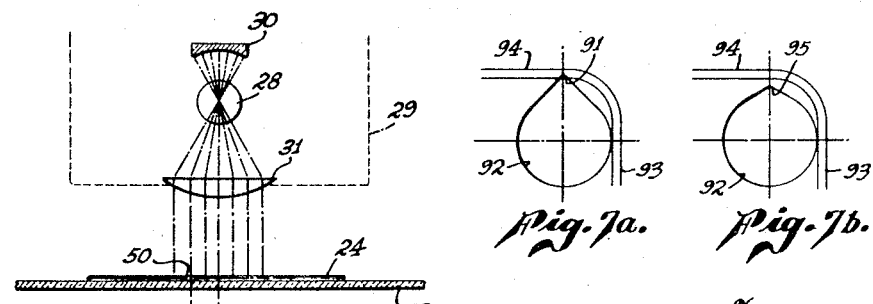
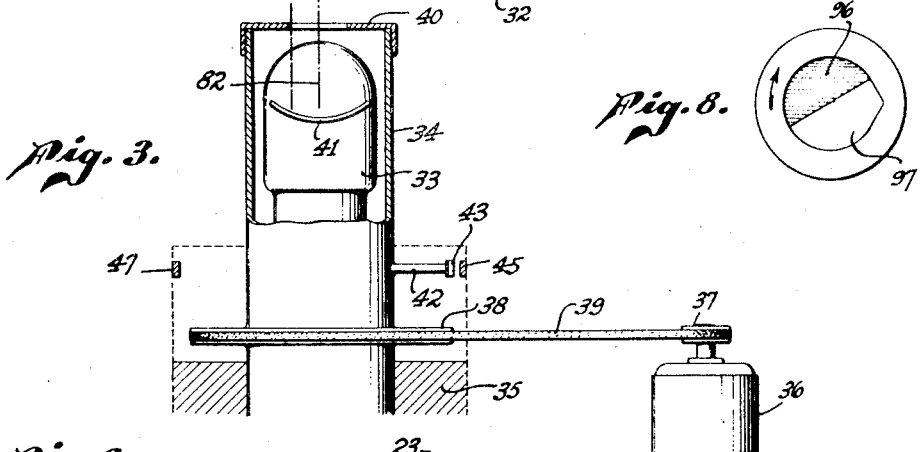

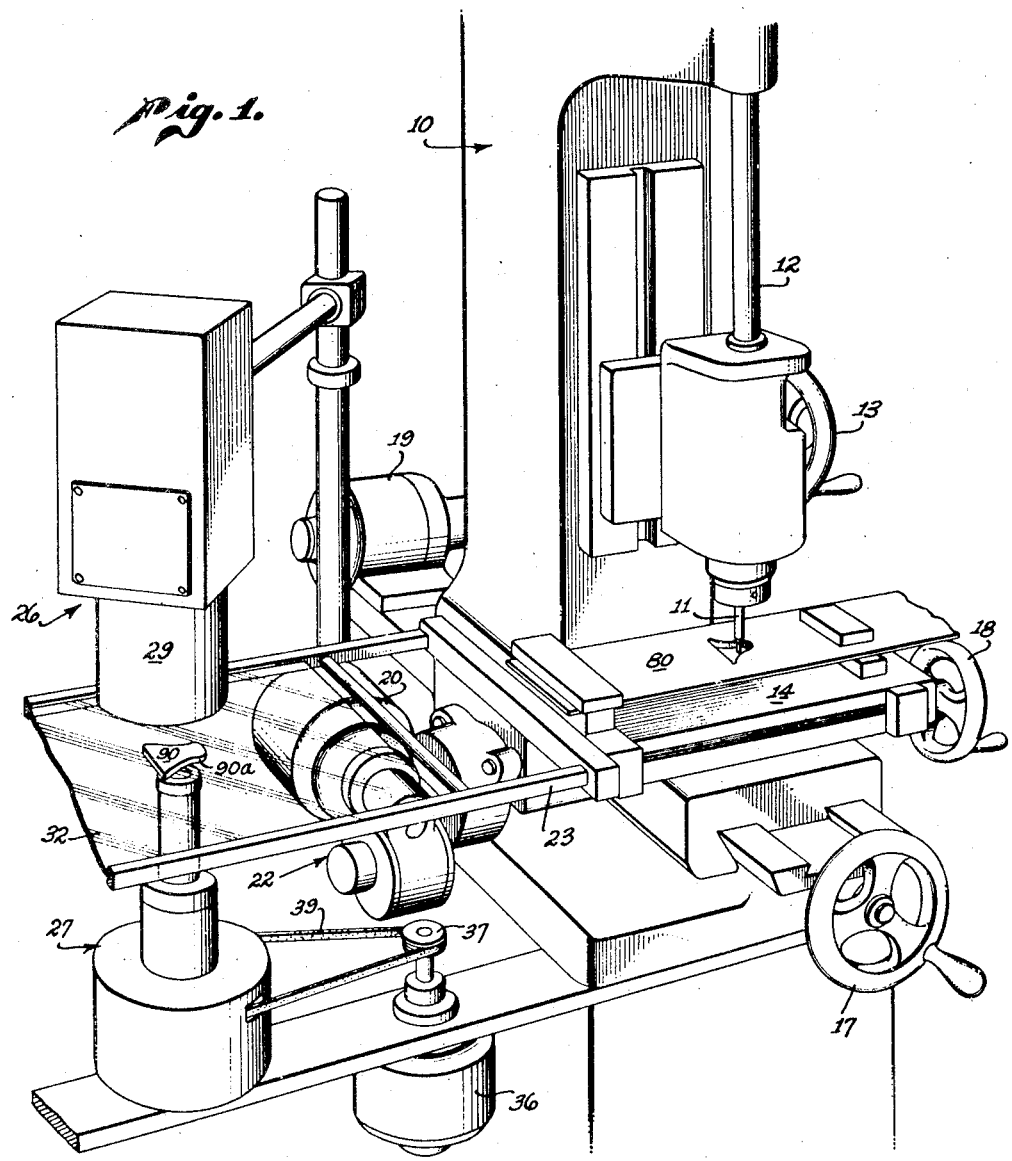

Nov. 18, 1947.  J. M. FOWLE ET AL  2,430,924
METHOD AND MEANS FOR PRODUCING CONTOURS IN MATERIAL
Filed Sept. 21, 1940  3 Sheets-Sheet 3

Inventor
JOHN M. FOWLE,
HARRY E. KENNEDY,
By Oscar A. Mellin
Attorney

Patented Nov. 18, 1947

2,430,924

UNITED STATES PATENT OFFICE 2,430,924

METHOD AND MEANS FOR PRODUCING CONTOURS IN MATERIAL

John M. Fowle, Piedmont, and Harry E. Kennedy, Berkeley, Calif., assignors to The Linde Air Products Company, a corporation of Ohio Application September 21, 1940, Serial No. 357,778

18 Claims. (Cl. 90—13.5)

This invention relates to the production of contours or shapes in material, having for its primary object the automatic reproduction of a desired contour from a drawing, model, or other representation of its configuration.

A further object of the invention is to provide an apparatus in which the lines of a drawing or the outline of a part are caused to dictate automatically the direction in which work in a machine tool is to be fed, for the purpose of obtaining an accurate reproduction of the shape represented by the drawing or part.

Another object of the invention is to employ radiant energy in connection with a drawing or other contour of a part in such manner as to cause work in a machine tool to be fed automatically along a path duplicating the drawing or contour, enabling a stationary cutter to reproduce the desired shape accurately in the work.

Still another object of the invention is to automatically produce an accurately mating punch and die from a single drawing or other outline representative of the contour of the parts to be stamped by the punch and die.

The invention possesses numerous other objects and features of advantage, some of which, together with the foregoing will be set forth in the following description of apparatus exemplifying the invention and employing its novel method. It is to be understood that the present invention is not limited in any way to the specific method and apparatus described in the present application, as various other embodiments may be adopted within the scope of the appended claims.

Referring to the drawings:

Figure 1 is a perspective view of a machine tool with the work feeding and cotnrolling devices attached thereto;

Figure 2 is a diagrammatic view, illustrating the work table and drawing support in connection with the feed screws and motors for rotating them in different directions;

Figure 3 is a diagrammatic side view of the sensing device;

Figure 6 is a modification of the manner of connecting the work table and drawing table shown in Figures 1 and 2.

Figs. 7a and 7b are diagrammatic views illustrating the position of two modified forms of shutter at a corner formed by the lines of the drawing; and Fig. 8 is a plan view of the shutter, illustrating the use of an optional light shield.

Figure 4:
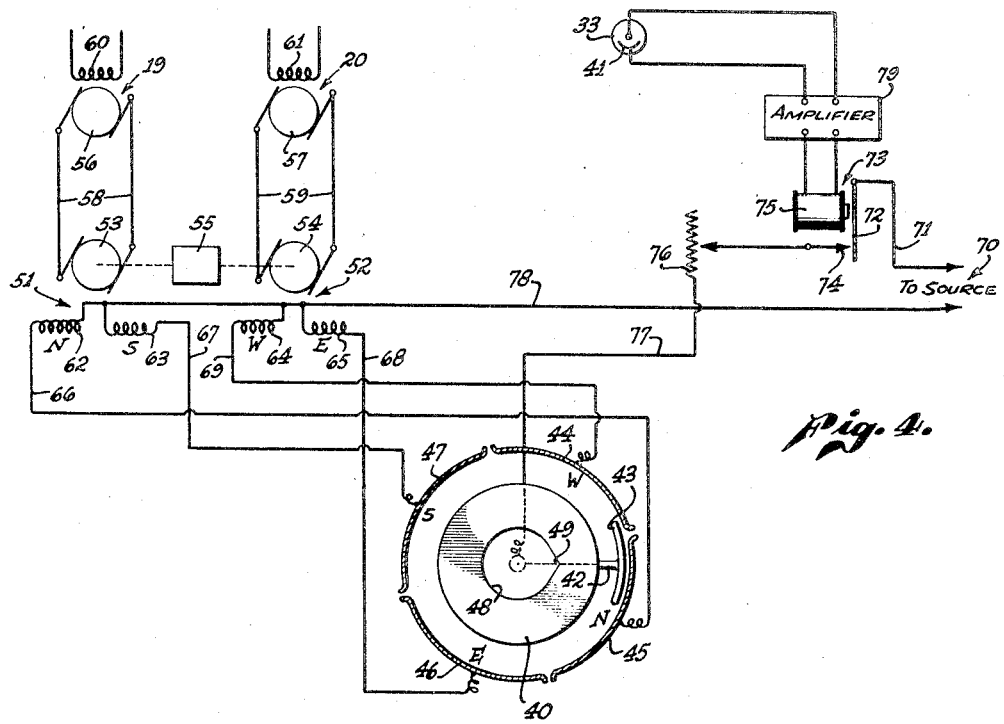
Figure 4 is a diagram representing the circuit employed in the form of invention shown in Figure 1.

The arrangement shown in the drawings contemplates the obtaining of impulses through the intersection or overlapping of a sensing device with the lines of a drawing or outline of a part, by recurrently translating an opening in the device relative to successive small edge zones along the contour of the part, and employing these impulses to produce a feeding of the work in the same direction as the corresponding line of the drawing or the outline. Although the principles of the invention may be adapted for use with other types of impulses, the invention has been disclosed as employing light impulses because of the relative simplicity of the apparatus and because the pattern may be formed quickly and easily by drafting room or photographic methods, and the light impulses are easily controlled. If a milling machine whose cutter is rotatable about a fixed axis is used, the movement of the work table by its feed motors causes a cut to be made in the work as dictated by the drawing line or outline. If the drawing is coupled to the work table, it will be moved by the feed motors in the same direction as the work table, maintaining the sensing device always in the same relation to each new increment or portion of the line or outline, in order that it may continue to direct the advance of the work in accordance with the particular direction which the line or outline is pursuing. The process is continuous, with the work table always being moved so as to keep the line correctly disposed with respect to the fixed position or location of the sensing device. Accordingly, the stationary cutter cuts a path in the work which is precisely the equivalent of the outline in the drawing or part.

It may be pointed out that the drawing or representation must direct the path or locus of the work outline in such a manner that the cutting surface of the tool will remove material only beyond the borders of the desired form. In the particular type of the invention which we are describing, the cutting tool is a rotating end mill having a diameter of appreciable magnitude when considered in relation to the size and accuracy of the finished part. Therefore, the actual path of the work table must trace, not a duplication of the finished product but rather must trace a figure which is larger or smaller than the outline by a fixed normal distance equal to the radius of the cutter. If the trace or path of the work table is larger than the drawing outline by a fixed normal distance equal to the radius of the end mill, the resulting product, after the passage of the cutter, will be a male duplication of the drawing outline. Conversely, if the work table traces a path or locus smaller than the drawing outline by a fixed normal distance equal to the radius of the end mill, the resulting product will be a female duplication. We will endeavor to show how our invention automatically directs the work table over either of such paths to produce male or female duplications from a single drawing.

The apparatus consists of a conventional vertical milling machine 10 having a mill or cutter 11 secured to a spindle 12 rotatable about a fixed vertical axis, the cutter being shiftable along this axis, as by means of the hand wheel 13, to determine its vertical position with respect to a work table 14 disposed below it. This table can be moved in directions at right angles to one another by feed screws 15, 16, which are rotatable in either direction by the respective hand wheels 17, 18 or by electric motors 19, 20 whose driving shafts are coupled to the feed screws through suitable mechanical connections 21, 22, as a worm wheel drive or spur gearing.

A bracket 23 is attached to the movable work table 14 for the purpose of carrying a template having a contour edge zone and a surrounding background which differentially affect light, such as a drawing 24 or other outline 90a of the part to be cut out in the work attached to the movable work table. Disposed above this bracket is a source of radiant energy 26, and placed below it is a sensing device 27. The source of radiant energy in the present instance consists of a light 28 enclosed within a suitable housing 29. Behind the light is a reflector 30 for directing the light through a condensing lens 31, so that parallel rays will shine on the drawing 24 or other object 90 placed upon a transparent glass 32 carried by the bracket. If desired, the drawing may extend across the bracket without the aid of the glass.

The sensing device 27 includes a photoelectric cell 33 mounted rigidly within a tube 34 rotatable in a supporting bearing 35 by an electric motor 36 having driving connection with the tube through the agency of a pulley 37 mounted on the motor shaft, a driven pulley 38 fixed to the tube, and an intervening belt 39. A shutter 40 is disposed at the top of the tube 34 for the purpose of determining the passage of light through the drawing 24 placed on the transparent glass 32 to the light sensitive cathode 41 of the photoelectric cell 33. Also secured to the tube so as to revolve in synchronism with the shutter is an arm 42 having a contact shoe 43 adapted to engage with four stationary segments 44, 45, 46, 47 disposed circumferentially around the rotatable tube 34. The shutter 40 has an opening consisting of a circular or arcuate portion 48 and a portion beyond the periphery of the arcuate portion, preferably a generally V-shaped notch 49 whose sides are tangent to the circle. The center line of this notch 49 lies in the same plane as the center line of the rotatable contacting shoe 43.

The motion of the feed motors 19, 20 and the direction of such motion is determined by the engagement of the contact shoe 43 with the segments 44, 45, 46, 47, and also by the relation of the shutter opening 48, 49 with respect to the drawing line 50, which governs the passage of light to the photoelectric cell 33. As shown diagrammatically in Figure 4, current is delivered to the feed motors 19, 20 by the respective generators 51, 52, whose armatures 53, 54 are rotated by a common motor 55. These armatures 53, 54 are electrically connected with the motor armatures 56, 57 by the respective leads 58, 59, the feed motor field coils 60, 61 being separately excited. Each generator 51, 52 has two separate fields so connected as to impart opposite generator polarity so that excitation of one field will cause current to be generated in one direction to rotate the feed motor one way, while excitation of the other field will reverse the direction of the generated current and cause the same feed motor to rotate the other way.

For convenience of reference, the feed motor 19 will be assumed to rotate its feed screw 15 so as to move the work table 14 in either a north or south direction, while the other feed motor 20 will be considered as capable of rotating its feed screw 16 so as to move the work table 14 in an east or west direction. These specific points of the compass have been referred to solely for purposes of convenience, and they are merely intended to represent the fact that one feed motor is capable of moving the work table in directions at right angles to the directions in which it is movable by the other feed motor. Quite obviously, the machine can occupy other positions in which its feed screws will not lie in the particular compass directions mentioned above.

If the north or N generator field coil 62 is excited by the controlling switch means, the generator 51 will deliver current to the feed motor 19 so that it advances the work in a north direction. But if the south or S field coil 63 of this generator is excited, the direction of the generated current will be reversed to produce a reversal in the direction of rotation of the feed motor 19, causing it to feed the work table 14 in a south direction. Similarly, excitation of the west or W generator field 64 causes the other feed motor 20 to rotate in a direction productive of movement of the work table to the west, while excitation of the east or E generator field 65 reverses the direction of current delivered to the feed motor 20 and causes it to move the work table 14 in an east direction.

The particular generator field or fields which are excited is determined by the engagement of the rotatable contact shoe 43 with the four stationary contact segments 44, 45, 46, 47. The north or N segment 45 is connected to the N field 62 by the lead 66; the opposed south or S segment 47 is connected to the oppositely wound S generator field 63 by the lead 67; the east or E segment 46 is connected to the east field 65 by the lead 68; and the opposed west or W segment 44 is connected to the west field 64 by the lead 69. Excitation current for these fields is derived from a suitable D. C. source 70, one line 71 of which is connected to the movable contact 72 of a relay 73, which contact is adapted to engage a fixed contact 74 upon passage of current through an attracting electromagnetic coil 75. The fixed contact 74 is connected with a variable speed control rheostat 76, the rheostat in turn being connected to the rotatable contact arm 42 by means of the lead 77. The contact shoe 43 will permit current to pass to the various generator fields 62, 63, 64, 65 upon engaging the respective stationary segments 45, 47, 44, 46. The return circuit to the D. C. source 70 from the four generator fields is made through a common connection 78.

According to the drawings, the four stationary segments 44, 45, 46, 47 each extend arcuately for substantially 90 degrees, while the rotating shoe 43 has an arcuate extent of substantially 45 degrees. During its rotation, the shoe will contact any one segment for 180 degrees and any two adjacent segments simultaneously for 45 degrees. As aforementioned, since the four stationary segments 44, 45, 46, 47 are connected to the four generator fields 64, 62, 65, 63, each segment represents one of the four major directions west, north, east and south in which the work table 14 is movable. With the relay contacts 72, 74 closed, if the rotatable shoe 43 engages the N segment 45, the work table will be moved north; if it contacts the E segment 46, the work table will move in the east direction; if it contacts the S segment 47, the motion is south; and if contact is made with the W segment 44, the motion of the table is west. Similarly, if the shoe contacts two adjacent segments simultaneously, the corresponding fields on both generators 51, 52 are excited simultaneously, and a composite motion will be imparted to the work table. Thus, engagement of the shoe with the N and E segments 45, 46 will cause the table to be moved NE; its contact with the E and S segments 46, 47 will cause motion in the SE direction; its engagement with the S and W segments 47, 44 will produce motion in a SW direction; and its simultaneous contact with the W and N segments 44, 45 will cause the work table 14 to be moved in the NW direction. Because of the angular disposition of the four stationary segments and the single rotatable shoe, the switch may be considered as having eight major positions, designated by the compass point abbreviations N, NE, E, SE, S, SW, W, and NW, each position covering 45 degrees of rotation.

The excitation of a particular generator field depends not only upon the engagement of the rotating shoe with its particular stationary segment, but also upon the passage of light through the shutter opening 48, 49 onto the photoelectric cell 33. Such passage of light controls an impulse, which is transmitted to an electronic amplifier 79 for the purpose of increasing its value sufficiently to energize the relay coil 75 and cause it to attract the movable contact 72 into engagement with the fixed contact 74. When these relay contacts are closed, the circuit is completed to those generator field coils whose stationary segments are being engaged by the rotatable contact shoe 43. However, if no light is passing to the photoelectric cell 33, the relay contacts are open and no generator fields are excited, causing the feed motors 19, 20 to be stationary.

In the actual operation of the apparatus, the switch arm 42 is rotated with the shutter 40 by the electric motor 36 at a steady speed, so that if the relay contacts 72, 74 are held closed continuously there will be no net motion of the work table 14 in any direction, because the feed motors 19, 20 will merely oscillate equal distances back and forth, all forward motion of the work table being nullified by equal and opposite backward motion. It is apparent also that no motion whatever is caused if the relay contacts 72, 74 are continuously held open, since the generator field currents are entirely interrupted and the feed motors 19, 20 cannot move due to the lack of current delivered from the generators 51, 52.

From the foregoing, no progress in the work table 14 is obtained if the relay 73 is held either continuously open or closed. But if the relay can be made to close only while the rotating switch shoe 43 is contacting the N segment, for example, a small motion in an N direction will take place. If this action is repeated with each revolution of the switch shoe 43, a series of small movements in an N direction will blend into one another to produce a substantially steady N feed. The photoelectric cell 33 and amplifier 79 have the ability to operate the relay substantially in exact accordance with the presence or interruption of light falling on the light sensitive element of the cell. Such presence and interruption of light at the proper instant in the rotation of the switch arm 42 can be used to produce motion in any one of the eight major directions, and proper timing of the starting and stopping of the light passage to the photoelectric cell 33 will produce motion in any intermediate direction by combination of feeds. In other words, the arrangement shown in Figure 4 is capable of producing movement of the work table 14 in any direction in a single plane.

Figure 5A:
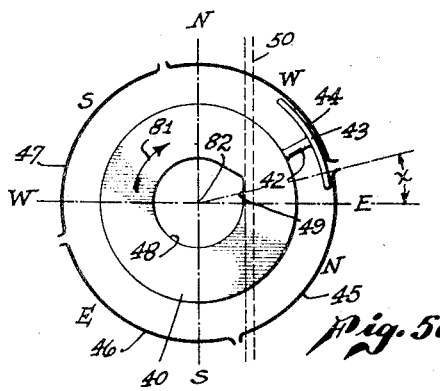
Figures 5a, 5b and 5c are diagrammatic representations of the sensing device, useful in explaining the operation of the invention.

The drawing 24 preferably is in the nature of a blueprint with relatively heavy transparent or translucent lines 50 representing the outline to be cut in the work 80 fastened to the table 14, the areas bordering lines being opaque. This drawing 24 is placed between the shutter 40 and the light source 28, as by supporting it on the transparent glass 32, and the work table 14 and drawing 24 coupled thereto moved manually by rotating the feed screws 15, 16 through the agency of the hand wheels 17, 18, until a line of the drawing is approximately tangent to the circular portion 48 of the shutter hole (see Fig. 5a). As the shutter 40 rotates, the notch 49 in the shutter hole moves in an orbit and will cross or overlap the transparent line or contour edge 50 with each rotation of the shutter, and in so doing will permit light passing through the line to continue on through the shutter 40 and strike the photoelectric cell 33 while the notch is moving in a predetermined direction relative to the line, e. g., tangential, closing the relay contacts 72, 74 and allowing current to pass through the particular generator field or fields whose associated stationary segment or segments might be engaged by the rotating shoe 43. The work table 14 will be moved by a minute amount, and since the shutter 40 is being rotated continuously by the electric motor 36, the notch 49 will intermittently intersect or overlap the transparent line 50 once during each revolution, producing an intermittent feeding of the work table 14 in the same direction as the line 50 is proceeding.

For purposes of illustration, let it be assumed that a line 50 on the drawing 24 lies in a north and south direction, and that it is desired to move this line from south to north and obtain a corresponding feeding of the work 80 in the same direction. As aforementioned, the work table 14 is manipulated manually until the line is tangent to the circular shutter opening 48 (see Figure 5a). With the shutter 40 rotating in the direction of the arrow 81, the notch 49 will begin to move under the line 50. As soon as this occurs, light can pass through the notch opening to energize the photoelectric cell 33, and since at this instant the rotating shoe 43 is engageable with both the W and N segments 44, 45, both the W and N generator fields 64, 62 will be excited, causing the feed motor 19 to move the work table in an N direction, and the other feed motor 20 to move the work table in a W direction. The resultant motion will accordingly be in a northwest or NW direction. So long as the rotatable shoe 43 is engageable with the W segment 44, the work table 14 will move partly in a westerly direction, and since the bracket 23 supporting the drawing 24 is coupled directly to this table, the transparent line 50 being scanned by the shutter 40 will also move in the W direction, or toward the center 82 of the shutter, overlapping its circular hole portion 48 to a certain extent.

Figure 5B:
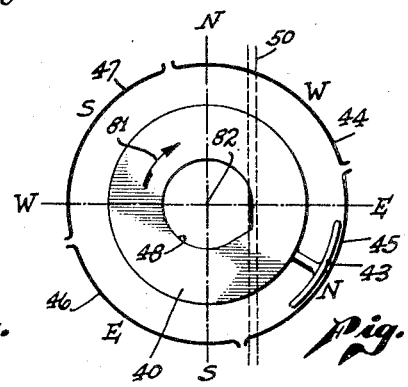

While the work table 14 is moving northerly, the transparent line 50 is also being moved in the same direction. As the shutter rotation in the direction of the arrow continues, the shoe 43 will move entirely off the W segment 44 and will contact only the N segment 45 (see Figure 5b). Since the opening 48, 49 in the shutter is still overlapping or intersecting the transparent line, light will pass through the cross-hatched zone to the photoelectric cell 33 causing the relay contacts 72, 74 to remain closed, resulting in the continued excitation of the N generator field 62 and the rotation of the feed motor 19 in the proper direction to continue movement of the work table 14 and the drawing 32 in the N direction. As rotation of the shutter 40 and shoe 43 continues further, the latter will also contact the E segment 46, and since light can still pass through the shutter to the photoelectric cell, both the N and E generator fields 62, 65 will be excited, and the two feed motors 19, 20 will operate to shift the work table 14 and drawing 24 in a northeast or NE direction.

Figure 5C:
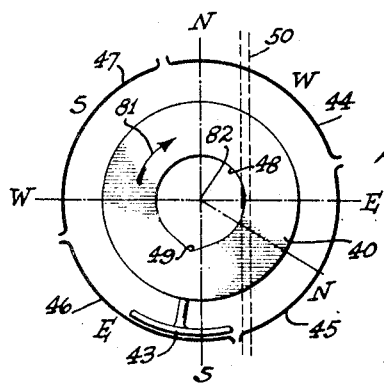

While the shoe was contacting both the N and E segments 45, 46, the drawing and work table moved NE, or diagonally away from the center line 82 of the shutter; and while only in engagement with the E segment 46 (see Figure 5c), the motion of the worktable 14 and drawing 24 continues in the E direction away from the center 32 of the shutter. At some instant in the angular motion of the shutter and shoe, the notch 49 will move from overlapping relation with the line 50, but due to the fact that the line was initially moved in a westerly direction toward the center 82 of the shutter from the position shown in Fig. 5a, light will continue to pass to the cell 33 through the circular shutter opening 48, allowing a compensating or return movement of the line 50 in a direction away from the center of the shutter to continue while the shoe is contacting the E segment 46. In Figure 5c an endeavor is made to show the relative separating motion then occurring between the shutter and the line. A very small area of overlap is shown by comparison with the larger area of overlap (shaded) in Figure 5B. Eventually, such eastward movement will shift the line back to its initial tangent position with respect to the circular shutter opening 48, and all feeding motion will stop, due to the cutting off of light to the photoelectric cell 33, and the resulting opening of the relay contacts 72, 74. This action will occur at a point before the rotatable shoe 43 contacts the S segment 47 to prevent a reversal in movement of the table and drawing from the major north direction. The foregoing cycle is repeated with each revolution of the shutter 40 and contact arm 42, the work table 14 being fed in a series of small steps from S to N, moving the drawing 24 along with it in a path parallel to this SN line.

A similar analysis can be made for any other line which may be chosen, regardless of the angle at which it is disposed. A curved line can be treated exactly as a series of very short straight lines, because the shutter 40 is responding to only very short portions of the line at any single revolution. Regardless of the angle of the line, the drawing is first moved or fed so that the line approaches closer to the center 82 of the shutter when the notch 49 first admits light to the photoelectric cell 33. As the shutter continues its rotation, the motion in the major direction takes place, but toward the end of the admission of light to the cell, the line is again moved away from the center of the shutter sufficiently so that the light is eventually cut off by the edge of the circular portion 48 of the screen hole. Accordingly, each cycle is completed after the line has moved away from the center 82 of the hole by the same amount that it has initially approached it, the net result being movement of the line 50 and work table 14 in the direction in which the line extends.

It is to be noted that the stationary switch segments 44, 45, 46, 47 are skewed with respect to the direction of the major feed axis by a certain angle $x$. These segments are advanced by this phasing angle with respect to the feed axis to insure that the shutter and line move toward each other during the initial period of motion. This angle must also compensate for the time lag in the action of the relay 73 and the response of the feed motors 19, 20. It has been found that an advance of the switching segments about 20 degrees will be sufficient for very slow rotation of the shutter 40, but this angle $x$ should be increased with increasing shutter speed. A permissible latitude of about plus or minus 10 degrees is usually found.

If there is insufficient angle of skew, the transparent line 50 will not be fed initially toward the shutter center line 82 by the required distance. Therefore, if the next portion of the line bends away from the shutter, the circular opening 48 will not overlap the line during subsequent revolutions, and the shutter and line will fail to maintain their required relation. In an extreme case, the line might thus leave the shutter to such an extent that no light would pass even through the notch 49, causing all motion to cease.

If there is too much angle of skew, the line 50 will be driven too close to the shutter center line 82. Insufficient time during the rest of the shutter revolution will remain for the line to move away from the shutter to its initial position tangent to the shutter hole 48. After the notch 49 has passed the line, the circular hole portion 48 of the shutter will continue to overlap the line by an appreciable amount, the line failing to move far enough away from the center 82 of the screen by the time the next segment, as the S segment in the foregoing specific example, is reached. The light will never be shut off from the photoelectric cell 33, and the relay 73 remains closed at all times. Further progression of the work 80 and drawing 24 in the desired direction is incapable of fulfillment because the feed motors 19, 20 will merely oscillate back and forth with each revolution of the switch. The angle of skew may be considered correct if the light is interrupted by any of the circular portion of the shutter and if the major motion is not reversed even momentarily toward the end of the cycle.

A further analysis will reveal that control of direction resides in the angular or time duration of the relay closure. The correct angular setting of the contact segments, 44, 45, 46 and 47, as designated by angle X, Fig. 5a will insure the line 50 being driven closer to the center, 82, during the initial portion of the cycle. If the relay contacts were thereupon opened early in the cycle and all feeds stopped, the line and the center would remain in this closer proximity. However, if the relay contacts were maintained closed sufficiently long, the line and the center would separate beyond their initial relation and would remain so separated after the contacts were opened. Thus a succession of short cycles drives the line closer to the center and a succession of long cycles drives the line farther from the center. If the line drifts away from the center ever so slightly, it will fail to overlap the circular portion of the shutter, but not the notch 49. The duration of overlap of the notch, and accordingly the light-admitting period, is short so that the cycle is shortened and the line is driven back toward the center, to approach a normal overlapping position. If the line drifts toward the center ever so slightly, it overlaps the circular portion of the shutter for a longer time, lengthening the cycle and driving the line away from the center toward a normal overlapping position.

It is to be understood that the cycles repeat themselves with sufficient rapidity, and the feed accomplished during one cycle is sufficiently small, to produce a substantially steady and unwavering feed of the work table with relation to the cutter. Therefore, the minute changes in distance between the line and the center occurring within each cycle are of no consequence in relation to the size of the figure. Consequently, if the line is made tangent to the circular portion of the shutter at the conclusion of each cycle, it may be considered as being exactly tangent at all other times.

In practice, it is found that the shutter 40 may operate over a wide range of speeds without altering the accuracy or smoothness of the finished cut. A speed of about 300 R. P. M. is usually chosen, although this may be reduced to 100 R. P. M. or increased to 500 R. P. M. at will. However, if the speed is altered, it becomes necessary to shift the stationary segments 44, 45, 46, 47 for the purpose of compensating for the time lag of the relay 73 and the time lag in the feed motor response to the application of exciting current to the generator fields. The limitation in the direction of increased R. P. M. is reached with the failure of the relay and other parts of the circuit to respond accurately to minute variations in the duration of illumination received by the photoelectric cell. The limitation in the direction of reduced R. P. M. is reached with the roughening of the finished cut caused by the more pronounced pulsating character of the feed.

As the drawing 24 progresses in relation to the shutter 40, so does the work 80 progress in relation to the cutter 11. In order to obtain an exact reproduction of the drawing, the diameter of the cutter should be made equal to the diameter of the circular portion 48 of the shutter hole. Since the center 82 of the shutter maintains a definite radial distance from the line of the drawing, which is the radius of the hole, the drawing designates the path of the edge of the cutter, and not the path of its center, because the center of the cutter, of necessity, maintains a fixed radial distance from the finished surface of the cut. The finished part will be either a male or female reproduction of the drawing outline, depending upon the side of the line on which the shutter has been started. The traverse around the drawing outline will be in opposite directions to produce male or female parts. Therefore, one drawing can suffice to direct the production of both male and female reproductions, even though the path traced by the center of the cutter in the work is totally different in the two cases.

In Figures 1 and 2, the drawing support bracket 23 is shown as being coupled directly to the work table 14, the reproduction being on a one to one scale. If greater accuracy is required, or in the event that the size of the finished part is so small as to be shown only with difficulty in a one to one scale drawing, a multiplier of motion may be interposed between the drawing bracket 23 and the work table 14, as shown in Figure 6. In that specific illustration, two identical pantograph multipliers 83, 84 are used, each of which has one end of a link 85 pivoted to a fixed support, the end of another link 86 to the supporting bracket 23 for the drawing, and the pivot connection 87 of two intermediate parallelogram links 88, 89 pinned to the work table 14. As the work table 14 moves, it produces twice the motion of the drawing support 23, requiring the figure on the drawing to be made twice as large as the finished part is intended to be. In order that the shutter 40 and cutter 11 hold geometrically similar relations to the drawing 24 and work 80, the circular opening 48 of the shutter is made twice the diameter of the cutter. Other multiplying devices than the one specifically shown may be employed.

In producing an accurately mating punch and die, their respective outlines must be made to differ slightly in order to obtain the necessary clearance. The extent of clearance can be determined on either the punch or die, or on both, during the process of cutting the outline with the apparatus shown in the drawings. With a given diameter of shutter opening 48, a male part can be made smaller or a female part larger by increasing the diameter of the cutter 11. Conversely, the same effect is obtainable by reducing the diameter of the shutter hole 48. However, it is inconvenient to alter this diameter within small limits by changing the shutter plate 40, but several other methods are available, as by providing an adjustable eccentric mounting of the shutter on the rotatable tube 34, so that the active portion of the shutter hole is made to revolve about a larger or smaller radius than if the hole were disposed coaxially of the tube. The circular portion 48 of the shutter opening will not follow a truly circular path, but actual operations of the device attest to the fact that this is of no consequence if only small variations from the coaxial positions are made.

Another method of cutting the proper clearance between the punch and die is to make use of light parallax, or the diffusion of the light emanating from the light source 28. Although the light rays leave the condensing lens 31 in substantially parallel paths, there is some inevitable diffusion. Accordingly, the shadow defined by the lines of the drawing is not critically sharp, becoming more blurred at increasing distances from the drawing 24. If the shutter 40 is moved downwardly away from the drawing by a small distance its opening will intercept this blurred outline, and in order for the tangential relation between the image of the line 50 and the circular portion 48 of the shutter to be maintained, the line must be displaced from the shutter as measured in a horizontal plane. This horizontal displacement between the shutter hole and drawing line produces the same effect as if the hole 48 had been made physically larger in diameter. Thus, the cut made on the work 80 may be controlled within small limits by adjusting the vertical distance between the drawing 24 and the shutter 40.

A further method of adjusting the clearance is by controlling the sensitivity of the electronic amplifier 79. If its sensitivity is reduced, as may be conveniently accomplished by a grid bias control more light will be required to operate the relay 73, and this additional illumination can only be accomplished by increasing the area of overlap between the shutter hole 48 and drawing line 50. Such decrease in sensitivity produces a final effect similar to a physical reduction in the diameter of the shutter hole 48, causing an increase in the size of a female object or a reduction in the size of a male object.

The present invention makes it possible to produce a female figure from a male sample or template, and conversely, a male figure from a female sample or template. Let it be assumed that it is desired to cut a punch and die for stamping some part. A template 90 of the desired part is cut out of paper and laid on a piece of glass 32, replacing the drawing 24 in the machine described above. The table 14 is adjusted manually so that the template 90 fully covers all portions of the shutter hole 48. The table then is gradually moved in the proper direction until a portion of the outline 90a of the template is tangent to the circular portion 48 of the shutter opening. As the shutter 40 rotates, its notched opening 49 will extend beyond the template outline 90a and allow light to pass to the photoelectric cell 33, which will start the progression of the work table 14 and connected template 90 in the same manner as was described above in connection with the drawing 24. The center 82 of the shutter will at all times fall within the opaque body of the template, the cutter edge corresponding exactly to the edge of the circular shutter hole in producing the finished part, which will be a reversal of the template to constitute the die.

The die thus formed may now be placed on the glass 32 after the removal of the template 90, and the table 14 moved until the opaque portion of the die covers the shutter circle 48 completely. The table is then moved manually until a portion of the die outline is tangent to the circular opening 48 of the shutter 40, which will permit the notch 49 to intercept and pass light to the photoelectric cell 38 as the shutter rotates. The work table 14 will begin to move as described above in connection with the drawing 24, and a cut will be made in another piece of metal fastened to the work table. The new part produced will be a reversal of the die, which was scanned by the rotating screen, and will be similar to the original template. This part becomes the punch and will be found to match the die within very close limits. The clearance between the punch and die can be determined by the operator who will make the necessary adjustments by following any of the above-described methods.

There are many advantages associated with working from a template to a female die, and then to the male punch. A full range of light intensity is transmitted to the photoelectric cell 33 through the highly transparent glass 32 supporting the sample 90, as defined by the perfectly opaque background of the sample. Such contrast in illumination is difficult of attainment by transmission of light through a drawing 24, and no errors are introduced due to variations in the width of a drawing line 50.

In Figs. 7a and 7b we have illustrated modifications for use when the contour being followed has sharp concave corners.

When the following figures having sharp concave corners, the notch 49, on the shutter should preferably have the smallest radial projection consistent with its function of admitting light for restarting the cycle. A comparison between a long and a short projection is illustrated in Figs. 7a and 7b. In Fig. 7a, the notch 91 projects beyond the circular arc 92 of the shutter by a substantial distance. The north and south line 93 is assumed to be moving southward, and with it the east and west line, 94. At the instant shown, the shutter projection 91 is just intersecting the east and west line 94. Thus the sensing element is acted upon by two lines simultaneously. The resultant of the two actions is to drive the work table across the corner designated by the drawing so that the corresponding corner in the work piece is not cut to its full depth. The advantage of a short radial projection, 95, Fig. 7b, resides in the lessening of this effect. The short projection illustrated is comparative in magnitude to the distance advanced by the work table in one complete cycle. It is apparent that the east and west line, 94, can approach much closer to the circular portion, 92, of the shutter before its presence will be felt by the sensing element. With such a configuration the bridging of corners is barely measurable and of no consequence.

In Fig. 8 we show means for compensating for excessive backlash in the feeding mechanism of the table. With higher shutter speeds or in case of excessive backlash existing in the work table feed screws, 15 and 16, one full cycle of operation occasionally fails to complete itself within one revolution of the shutter. During the initial part of the cycle the line 50 will approach closer to the center of the shutter, 82, but the two may fail to separate prior to a reversal of the major motion. To avoid instant stoppage of the feed occasioned by a failure of the relay contacts 73 to open, a light shield may be placed over a portion of the shutter hole. This is shown in Fig. 8 where 96 is the opaque light shield and 97 is the transparent opening remaining. This light shield positively interrupts the light and concludes the cycle so the next cycle may proceed in a normal fashion. After one or two more cycles, the shutter and the line will have resumed their normal tangential relation and the feed will continue.

Another purpose of the light shield is to permit reverse rotation of the shutter. For either rotation the same basic angular displacement of the contact arcs, 44, 45, 46, 47, is maintained. But whereas with right hand rotation as described in connection with Fig. 5, angle $x$ must be increased to compensate for time lag, with left hand rotation, angle $x$ must be reduced by an equivalent amount.

Having thus described our invention, what we claim and desire to secure by Letters Patent is:

1. An apparatus for reproducing a contour in work from a representation of such contour, which includes a supporting table for said work, a tool adapted to operate upon said work, a support for a representation of said contour, feeding means for moving said table with respect to said tool, a sensing device movable relatively to said contour, and a source of radiant energy, said sensing device including means responsive to said radiant energy for actuating said feeding means, control means interposed between said source and actuating means adapted to cooperate with said contour for controlling the flow of said radiant energy from said source at the said actuating means for cyclically translating said control means at frequent intervals by unidirectional rotation and movement of progression to cooperate with successive small edge zones along the representation of said contour and thereby cause radiant energy to flow cyclically to said actuating means for automatically causing said feeding means to move said table in instantaneous directions generally parallel to the successive overlapped edge zones of said contour.

2. An apparatus for reproducing a contour in work from a representation of such contour, which includes cooperable relatively movable work supporting means and tool means, means for supporting a representation of a contour, a source of radiant energy, feeding means for producing relative movement between said work supporting means and tool means and also for shifting said representation supporting means, a sensing device responsive to radiant energy received from said source for controlling operation of said feeding means, said sensing device including a shutter having an eccentric orifice, and means for producing unidirectional rotation of said shutter to cooperate periodically with successive portions of the representation of said contour for producing cyclic transmission of energy from said source to said sensing device to cause said feeding means to relatively move said work supporting means and tool means in directions dictated by the contour of the successive cooperating portions of said representation.

3. An apparatus for reproducing a contour in work from a representation of such contour, which includes a supporting table for said work, a tool adapted to operate upon said work, a support for the representation of said contour, feeding means for moving said table with respect to said tool, a source of energy, and a sensing device including means responsive to energy receivable from said source for controlling operation of said feeding means, said sensing device including an eccentric unidirectional rotatable portion cyclically translatable in successive adjoining circular paths and cooperable with successive small edge zones of the representation of said contour to cyclically transmit energy impulses from said source to said responsive means, said responsive means being operable to cause said feeding means to move said table in successive instantaneous directions determined by the direction of said respective impulses.

4. An apparatus for reproducing a contour in work from a representation of such contour, which includes cooperable relatively movable work supporting means and tool means, means for supporting a representation of a contour, feeding means for producing relative movement between said work supporting means and tool means and also for shifting said contour supporting means in proportion to such relative movement, a source of radiant energy, means responsive to radiant energy receivable from said source for producing operation of said feeding means, a rotatable unidirectional shutter having an opening for intermittently overlapping said contour to control transmission of energy from said source to said responsive means, whereby said feeding means is caused to relatively move said tool means and work supporting means and also said contour supporting means alternately toward and from the axis of said shutter equal distances at right angles to the instantaneous portion of the contour being overlapped by said opening.

5. An apparatus for reproducing a contour in work from a representation of such contour, which includes a cooperable relatively movable work support and tool, a support for a representation of a contour, electric motors for producing relative motion between said work support and tool in a plurality of different directions and also for simultaneously correspondingly shifting said contour support, and means for controlling the current delivered to said motors, comprising a source of radiant energy, means responsive to radiant energy receivable from said source, and a unidirectionally rotatable shutter having an eccentric opening for intermittently overlapping said contour to control the transmission of energy from said source to said responsive means.

6. An apparatus for reproducing a contour in work from a representation of such contour, which includes a cooperable relatively movable work support and tool, a support for a representation of a contour such as an outline, an electric motor for producing relative movement between said work support and tool along one path, a second electric motor for producing relative movement between said work support and tool along another path, means whereby said contour support is correspondingly shifted in accordance with movements along said paths, and means for controlling said motors, comprising a source of radiant energy directed on said outline, means responsive to radiant energy receivable from successive portions of said outline, a unidirectionally rotatable shutter having an eccentric opening for intermittently overlapping said portions to control the transmission of energy from said portions to said responsive means, and a rotatable switch synchronized with said shutter for determining the passage of current to said motors.

7. An apparatus for reproducing a contour in work from a representation of such contour, which includes a cooperable relatively movable work support and tool, a support for a representation of a contour, an electric motor for producing relative movement between said work support and tool along one path, a second electric motor for producing relative movement between said work support and tool along another path, means whereby said contour support is correspondingly shifted in accordance with movements along said paths, and means for controlling said motors, comprising respective generators for said motors each having an armature and two fields connected for opposite generator polarity, a source of direct current, a rotatable switch capable of selectively completing the circuit from said direct current source to the generator fields, a source of radiant energy, a photoelectric cell, a rotatable shutter having an opening for intermittently overlapping said contour to control the passage of energy from said source of radiant energy to said cell, and means responsive to energization of said cell for controlling the passage of current from said direct current source to said switch.

8. The method of reproducing a contour, which comprises placing a representation of said contour between a source of radiant energy and a photoelectric sensing element, cyclically withdrawing an opaque element from between successive small portions of said contour and said sensing element by continuous rotation of said opaque element in the same direction of rotation to permit passage of radiant energy to said sensing element, and employing the periodic impulses thus received by the sensing element for causing relative feeding movement between work and a cooperable tool in a direction generally parallel to the successive small portions of said contour for causing conjoint feeding of the representation of said contour in the same direction.

9. An apparatus for reproducing a contour in work from a representation of such contour which includes cooperable relatively movable work supporting means and tool means, means for supporting a representation of a contour, means for producing relative movement between said work supporting means and tool means, a source of energy, means responsive to energy receivable from said source for producing operation of said feeding means, a unidirectionally rotatable shutter having a noncircular opening for intermittently overlapping said contour as said shutter revolves continuously in the same direction of rotation to control transmission of energy from said source to said responsive means, and means for automatically maintaining the center of rotation of said shutter in a constant relationship to said contour.

10. An apparatus for reproducing a contour in work from a representation of such contour, which includes cooperable relatively movable work supporting means and tool means, means for supporting a representation of a contour, feeding means for producing relative movement between said work supporting means and tool means and also for shifting said contour supporting means in proportion to such relative movement, a source of radiant energy, means responsive to radiant energy receivable from said source for producing operation of said feeding means, a unidirectionally rotatable shutter having an opening for intermittently overlapping said contour to control transmission of energy from said source to said responsive means, whereby said feeding means is caused to relatively move said tool means and work supporting means and also said contour supporting means first toward and then from the axis of said shutter substantially equal distances at right angles to the instantaneous portion of the contour being overlapped by said opening, the said opening in the shutter having a circular portion the same being of a diameter equal to the diameter of the tool whereby the path of travel of the tool relative to the work will be larger or smaller than the representation of the contour by a fixed normal distance equal to half the diameter of the tool.

11. An apparatus for reproducing a contour in work from a template having a substantially opaque edge zone surrounded by a substantially transparent background, said apparatus comprising a tool; a photoelectric sensing element; supports for said work and said template; feeding means for moving said supports relatively to said tool and said sensing element respectively; said sensing element comprising a photoelectric cell, a shutter having opening means therein, and means for rotating said shutter continuously in the same direction at uniform speed so that at least a part of said opening means moves in an arcuate path and cyclically overlaps successive small portions of said edge zone to admit light to said photoelectric cell and thereby energize said cell while such part of said opening means is moving substantially tangentially to said respective portions; and control means actuated by said photoelectric cell and synchronized with the rotation of said shutter, said control means being adapted to operate said feeding means in resultant directions which are substantially tangent to such respective overlapped portion.

12. An apparatus as claimed in claim 11 wherein said opening means is shaped so as to admit light to energize said cell during time intervals varying with the degree of overlap between said opening and said edge zone, and wherein said control means is responsive to abnormally long and abnormally short time intervals respectively to shift said edge zone of said template laterally relatively to said opening to establish a predetermined normal degree of overlap.

13. An apparatus for reproducing a contour in work from a template having a contour edge zone and a background differentially affecting light, said apparatus comprising a tool; supports for said work and said template; a photoelectric sensing element; feeding means for moving said respective supports relatively to said tool and said element; said photoelectric sensing element comprising a photoelectric cell and a rotatable shutter having a generally arcuate opening normally disposed in substantially tangential relation to the contour line of said template, said opening being provided with a portion disposed beyond the periphery of said arcuate opening, said portion being adapted to overlap said contour line intermittently as said shutter rotates so as to pass a predetermined quantity of light from said contour line to said photoelectric cell to thereby energize said cell; and control means actuated by said energized photoelectric cell for governing the operation of said feeding means.

14. Apparatus as claimed in claim 13 wherein said portion comprises a generally wedge-shaped notch, the sides of which are substantially tangent to said arcuate opening.

15. An apparatus for reproducing the contour of a templet onto a workpiece; said apparatus comprising a tool; workpiece-supporting means relatively movable with respect to said tool in varying directions in a plane; a sensing device including means cyclically translatable in successively different directions relative to said templet so as to periodically and rapidly cooperate with successive small edge zones of said templet; feeding means including means adapted to move said tool and said workpiece-supporting means relatively to one another in successively different directions, in coordination with the motion of said translatable means; control means actuated by said sensing device for rendering said feeding means inoperative during such active portions of said cycles as said translatable means is moving in a predetermined direction relative to said successive small edge zones, said control means including skew angle means for skewing the cycle of motion of said feeding means slightly relative to the cycle of motion of said translatable means, whereby when said translatable means is moving substantially tangent to an edge zone of said contour during an active part of each cycle, said feeding means produces movement askew to the direction of said tangent.

16. The method of reproducing a contour which comprises relatively moving said contour and a tracer longitudinally of the contour, and during such relative movement continuously imparting other relative movement of continuous unidirectional rotation between said tracer and said contour sweeping over the contour to alternately increase and decrease the interception of the contour by the tracer and to vary the amounts of such increases and decreases in accordance with change in the direction of the contour, varying the direction of such first-mentioned relative movement in accordance with the changes in the amounts of such increases and decreases, and causing relative feeding movements between work and a cooperable tool proportional to said relative movements between said tracer and said contour.

17. The method of reproducing a contour which comprises relatively moving said contour and a tracer longitudinally of the contour, and during such relative movement continuously imparting other relative movement at uniform speed between said tracer and said contour sweeping onto and off of the contour along a predetermined continuous circular path having no abrupt reversal of direction therein to alternately increase and decrease the interception of the contour by the tracer with change in the direction of the contour, varying the direction of such first-mentioned relative movement in accordance with changes in such increases and decreases in interception of the contour, and causing relative feeding movements between work and a cooperable tool proportional to said relative movements between said tracer and said contour.

18. The method of reproducing a contour which comprises relatively moving said contour and a tracer longitudinally of the contour, and during such relative movement continuously imparting other relative movement of continuous rotation at uniform speed in the same direction of rotation between said tracer and said contour sweeping onto and off of the contour to alternately increase and decrease the interception of the contour by the tracer at successive points closely spaced progressively along said contour and to vary the amounts of such increases and decreases in accordance with changes in direction of the contour, varying the direction of such first-mentioned relative movement in accordance with changes in the amounts of such increases and decreases of interception due to changes in the contour, and causing relative feeding movements between work and a cooperable tool proportional to said relative movements between said tracer and said contour.

JOHN M. FOWLE.
HARRY E. KENNEDY.

REFERENCES CITED

The following references are of record in the file of this patent:

UNITED STATES PATENTS

| Number | Name | Date |
|---|---|---|
| 2,154,974 | Cook | Apr. 18, 1939 |
| 2,226,677 | Vikhman | Dec. 31, 1940 |
| 2,121,211 | Padva et al. | June 21, 1938 |
| 2,172,313 | Young | Sept. 5, 1939 |
| 2,069,508 | Rutemiller et al. | Feb. 2, 1937 |
| 2,331,337 | Meyer | Oct. 12, 1943 |